United States Patent [19]
Hazard

[11] Patent Number: 5,253,106
[45] Date of Patent: Oct. 12, 1993

[54] OBLIQUE VIEWING SYSTEM FOR MICROSCOPES

[75] Inventor: Edwin A. Hazard, Rochester, N.Y.

[73] Assignee: Amarel Precision Instruments, Inc., Fairport, N.Y.

[21] Appl. No.: 855,986

[22] Filed: Mar. 20, 1992

[51] Int. Cl.$^5$ ................. G02B 21/00; G02B 21/18
[52] U.S. Cl. ................. 359/368; 359/372; 359/379
[58] Field of Search ........... 359/368, 369, 372, 373, 359/377-384, 368-390, 399, 363; 354/155

[56] References Cited

U.S. PATENT DOCUMENTS

| | | | |
|---|---|---|---|
| 2,967,458 | 1/1961 | Stone | 359/375 |
| 3,417,685 | 12/1968 | Kato | 354/79 |
| 3,475,075 | 10/1969 | Stone | 359/384 |
| 3,484,150 | 12/1969 | Taoka | 359/227 |
| 3,574,295 | 4/1971 | Tasaki | 354/79 |
| 3,994,558 | 11/1976 | Schulz | 359/377 |
| 4,009,526 | 3/1977 | Abe | 359/377 |
| 4,009,929 | 3/1977 | Abe | 359/377 |
| 4,009,930 | 3/1977 | Abe | 359/377 |
| 4,290,666 | 9/1981 | Rudel | 359/503 |
| 4,448,498 | 5/1984 | Muller | 359/377 |
| 4,492,441 | 1/1985 | Hopkins | 359/377 |
| 4,527,869 | 7/1985 | Nihoshi | 359/372 |
| 4,576,450 | 3/1986 | Westphal | 359/372 |
| 4,674,845 | 6/1987 | Matsumara | 359/377 |
| 4,697,893 | 10/1987 | Fehr | 359/377 |
| 4,714,327 | 12/1987 | Marshall | 359/364 |
| 4,717,246 | 1/1988 | Fehr | 359/377 |
| 4,867,405 | 9/1989 | Nakamura | 248/281.1 |
| 4,869,021 | 9/1989 | Gregory | 359/399 |
| 5,059,010 | 10/1991 | Yomoda | 359/372 |
| 5,132,837 | 7/1992 | Kitajima | 359/374 |
| 5,134,515 | 7/1992 | Papritz et al. | 359/363 |

FOREIGN PATENT DOCUMENTS

| | | | |
|---|---|---|---|
| 55209 | 6/1982 | European Pat. Off. | |
| 102607 | 6/1982 | Japan | 359/368 |
| 651139 | 8/1985 | Switzerland | |

OTHER PUBLICATIONS

Meiji Labax SMD Inspection System Microscope 3 pages product sheet dated May 2, 1989.
Wild Leitz SMD Inspection Station w/Wild M3Z Zoom Stereomicroscope—date Nov. 1989.
Wild M3 Series Product Sheet—date unknown.
Wild Hearburgg "Try Looking at Your Specimens from Another Viewpoint," advertising page from Micro Elec. Mfg. & Testing Magazine Mar. 1988.

*Primary Examiner*—Bruce Y. Arnold
*Assistant Examiner*—Thong Nguyen
*Attorney, Agent, or Firm*—M. LuKacher

[57] ABSTRACT

An oblique viewing system is attachable to a microscope to selectively obtain a perpendicular view (along the optical axis of the microscope) and oblique views of surfaces of objects under inspection. The attachment is connected to the microscope's objective end by a coupling on a housing containing the viewing system. The system includes a folding mirror and an oblique viewing mirror, spaced from the folding mirror and having its reflecting surface facing the object under inspection. A latching or a toggle mechanism, connected to a rotatable support for the folding mirror, enables that mirror to be set in either of two positions, one out of the way of the perpendicular path to provide a perpendicular view and the other to orient the reflecting surface thereof to face the reflecting surface of the oblique viewing mirror along an optical axis there between. The oblique viewing mirror is supported in a mechanism which enables rotation and translation thereof so as to maintain the optical path to the microscope approximately the same over a range of oblique viewing angles to the surface of the object under inspection. A lens movable along the optical axis between the mirrors adjusts the focus to accommodate different vertical heights of the surface under inspection. By virtue of this lens and the mechanism for orienting the viewing mirror, focusing adjustments of the microscope are made unnecessary.

14 Claims, 6 Drawing Sheets

OBLIQUE VIEWING SYSTEM FOR MICROSCOPES

FIELD OF THE INVENTION

The present invention relates to oblique viewing systems for microscopes and particularly to oblique viewing accessories (OVA) attachable to various types of microscopes, including stereo and zoom microscopes.

An OVA in accordance with the invention is especially suitable for converting a microscope into a surface inspection station by providing, in addition to a perpendicular view, oblique views of integrated circuits and circuit boards, particularly boards using microminiature, surface mount assemblies for efficient, accurate inspection, particularly to determine the acceptability of the solder joints thereof.

DESCRIPTION

There are available OVAs which provide perpendicular and oblique views of the surface under inspection. Conversion from the perpendicular to the oblique view mode and back again has required precision mechanisms to enable the accessory to slide in and out of oblique viewing position. It is a feature of this invention to provide an OVA which can be changed over from perpendicular view to oblique view position and back again simply by turning a knob and without the complexity and additional expense of the mechanisms for such purpose heretofore provided.

Also, it is desired to provide oblique views at different viewing angles. The OVA devices heretofore available have, as in the case of oblique to perpendicular viewing facilities thereof, required expensive and precision mechanisms and optics to afford that function. It is a feature of the invention to provide an OVA wherein different oblique views may be obtained without the need for refocusing of the microscope.

Another problem in carrying out oblique view inspections of the surface is to accommodate objects having their surfaces at different heights along the optical axis of the microscope, such as when surfaces of printed circuit boards to be inspected are located at different heights. An OVA in accordance with the invention is readily adjustable to accommodate the location of the surface of the object to be inspected at different heights, again without the need for refocusing the microscope.

Briefly described the invention provides a system for viewing the surface of an object with a microscope along a first or along a second axis oriented at different angles to the surface of the object under test. The first axis may be perpendicular to the surface and the second axis oblique to the surface for oblique viewing thereof. The system makes use of a first or folding mirror and second or oblique viewing mirror. The first mirror is held by a holder, having a toggle or latch mechanism, in either a first position or a second position. In the first position, the folding mirror is displaced from the first axis to clear the direct viewing path and permit perpendicular viewing of the surface. In the second position, the reflecting surface of the first mirror is oriented, transversely to the optical axis of the microscope and is spaced from the viewing mirror along a third axis, which is part of the optical axis of the system. The rest of the optical axis is in the oblique viewing path between the viewing mirror and the surface. In accordance with a feature of the invention, the viewing mirror is tiltable in a support mechanism which provides compound, rotational and translational movement so as to maintain the optical path between the folding mirror and the surface under inspection approximately the same over a range of oblique viewing angles. A lens between the folding and viewing mirrors is moveable along the optical axis so as to adjust the focus to accommodate the surface under inspection being at different heights.

The foregoing are other objects features and advantages of the invention as well as the presently preferred embodiments for carrying out the invention, will become more apparent from the reading of the following description in connection with the accompanying drawings in which:

DETAILED DESCRIPTION

Figure 1:
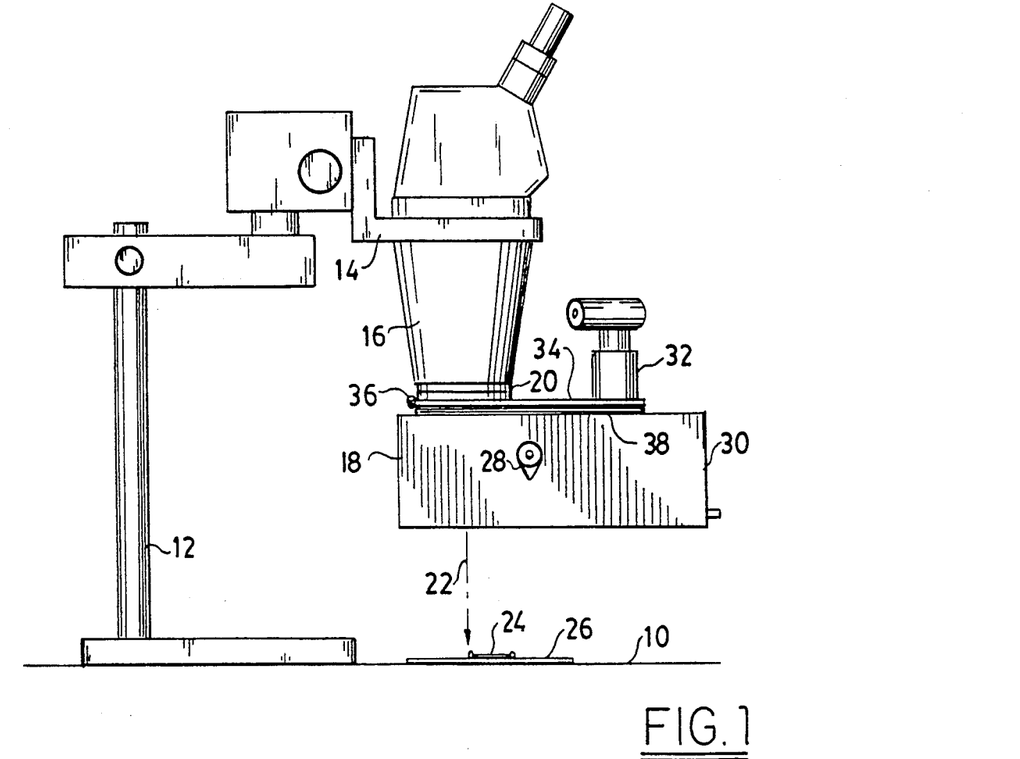
FIG. 1 is a side elevational view of a microscope with an OVA in accordance with the invention attached thereto.

Referring to FIG. 1, there is shown the top 10 (surface) of a table or optical bench on which a stand 12 having a boom or extended arm 14 supporting a microscope 16. The microscope may be a commercially available microscope such as a stereo microscope, for example the Nikon Model SMZ 1 or 2 or Olympus Model SZ-60. An OVA 18 provided by the invention has an adapter 20 which may be attached, as by screwing, into a mount at the objective end of the microscope 16. The OVA 18 is shown in its perpendicular viewing mode along an axis 22 which presents the surface of a chip 24 (eq. a surface mount component) on the circuit board 26 resting on the table top 10 for inspection.

The inspection may be by perpendicular viewing or oblique viewing. Either perpendicular or oblique viewing modes is selected simply by rotating a control knob 28 on a side wall of a housing 30 containing the oblique viewing system of the OVA 18.

In the oblique viewing mode it is desirable to inspect the surface 24 from different aspects circumferentially about the chip 24. This is accomplished by means of a motor drive mechanism 32 which is fixedly held to the adapter 20 on a plate 34 which is clamped by a screwed down clamp 36 around the adapter 20. The motor and plate therefore do not move. A belt drive 38, around a pulley driven by the motor 32 and a pulley on a collar extending from the housing 30, drives the housing orbitally for viewing over a 360° rotation of the OVA 18.

The housing 30 (FIGS. 2 and 3) has a top wall 40, side walls 42 and end walls 44. The adapter 20 is attached to a collar 46. This collar is journaled in a bearing assembly 48 connected to the top 40 of the housing. The plate 34 is attached by the clamp 36 at an end thereof. A pulley 50, connected at the top 40 and around which the belt 38 is entrained, rotates the housing about the perpendicular viewing axis 52, which is the optical axis of the microscope 16. This axis extends through an opening in the top 40. A lens 54, such as a doublet presenting a negative power, is disposed within the collar above the opening so as to compensate partially for the additional optical path length interposed by the OVA. Another lens 56, which may also be a negative power doublet, is disposed in the housing and may be carried on a support 58 on which a first or folding mirror 60 is mounted. The support 58 is rotatable on a shaft 62 which extends through the side walls 42 of the housing and on each end of which a different knob 28 is mounted. Suitable washers and spacers for capturing the shaft in the side walls are used.

Figure 2:
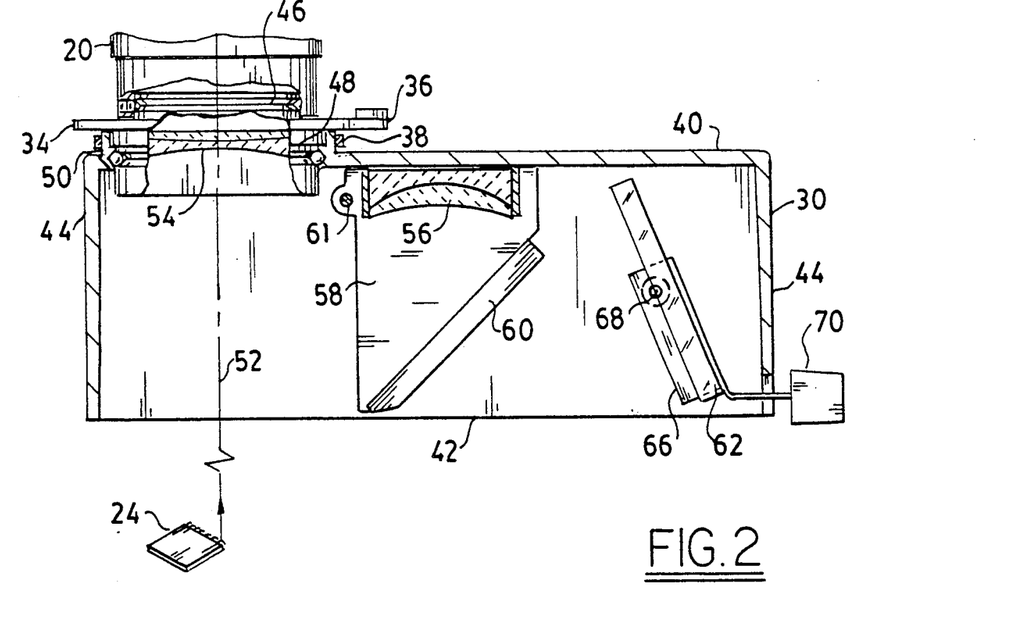
FIG. 2 is a sectional view through the OVA shown in FIG. 1 with the folding mirror in the perpendicular viewing position.

The support 58 is associated with a mechanism which maintains the folding mirror 60 in a position out of the way of the perpendicular view path 52 as shown in FIG. 2 or in the path perpendicular to the optical axis 52. The axis is folded to provide a third axis 59, through the center of the lens 56, to a second mirror which provides the oblique viewing mirror 62. This extends the optical axis along a third path 64 to the surface under inspection. The reflective surfaces of the folding mirror 60 and the oblique viewing mirror 62 face each other, and the reflective surface of the viewing mirror 62 faces the object 24 under test.

Figure 3:
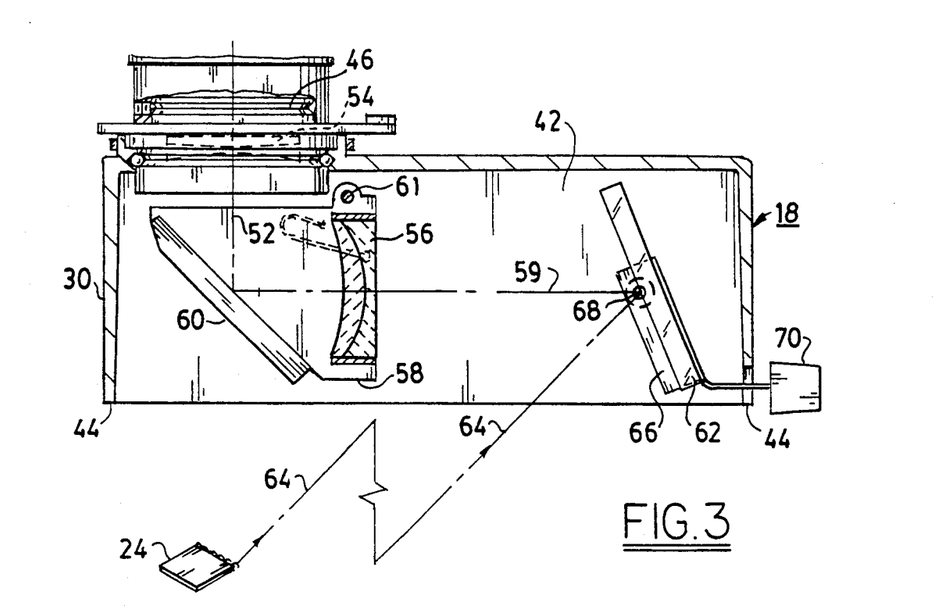
FIG. 3 is a view similar to FIG. 2 with the folding mirror in oblique viewing position.

In order to adjust the oblique viewing angle, the mirror 62 is contained within, a frame 66 pivotally connected to the side walls 42 by shafts extending laterally from the frame 66 to the define a pivot axis 68. Sufficient friction by way of washers or other means may be provided so as to cause the mirror 62 to be retained at whatever angle it is set by movement of a handle 70 which extends through a slot in an adjacent end wall 44 of the housing 30.

Tilting of the viewing mirror about the axis changes the optical path length to the surface of the object 24 under inspection. To accommodate this change in path length and out of focus condition, with the embodiment of the OVA shown in FIGS. 2 and 3, the focus of the microscope 16 is adjusted. It is desirable to provide a mechanism for changing the oblique viewing angle without requiring an adjustment of focus. Such mechanisms are shown in the embodiments of the invention illustrated in FIGS. 4 and 5 and also in FIGS. 6 through 12.

In FIGS. 2 and 3, the adapter 20 is connected to a annular v-shaped groove in the collar 46. In the embodiment shown in FIG. 4, the adapter 80 is provided by a screw type adapter at the objective end of the microscope. The adapter receives a inner race of a ball bearing journal 82. The mount 84 of a motor drive 86 is connected to an inner race or bearing holder 85, which is connected to the adapter 80. The outer race is a ring 88 attached to the top 90 of the OVA housing 92. This ring is driven by a rubber tired puck 94 which rotates the housing and the OVA orbitally about the axis perpendicular to the surface 96 of the object being viewed.

The support for a folding mirror 98 and a lens 100 for adjustment of the optical path (a lens similar to the lens 54 is not used in this embodiment, since its function may be provided by the zoom lens of the microscope). The support is provided by side plates 102 of a support frame 104 (see also FIG. 5). A hairpin toggle spring 106, is shown in two positions (the oblique viewing mode as per FIG. 4 or the perpendicular viewing mode (the dot double dash lines in FIG. 4). The support frame 104 is journaled in the side plates 108 of the housing 92 on a shaft 110, to the ends of which the knobs 28 are connected via suitable washers and spacers 112 and 114. The toggle spring 106 is connected at one of its ends to a side plate 102 and at the other end to the side wall 108. The spring snaps over to hold the folding mirror stably in either the position shown in full lines in FIG. 4 for oblique viewing, or in the line made up of long and double short dashes, for perpendicular viewing of the surface 96 of the object under inspection. This arrangement provides means for holding the folding mirror in perpendicular or oblique viewing positions.

Figure 4:
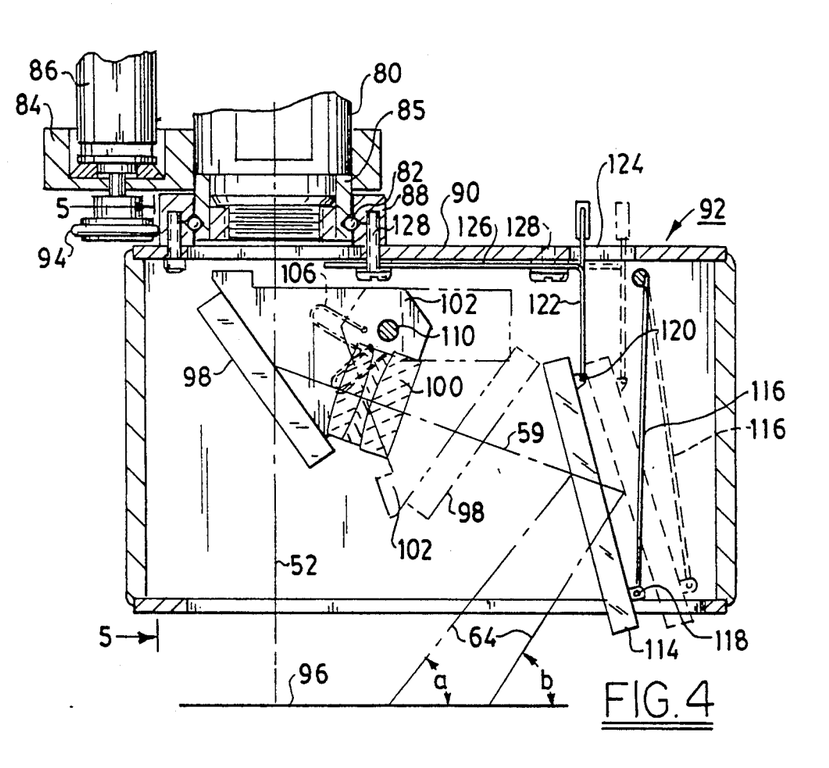
FIG. 4 is sectional view showing an OVA and its coupling to the objective end of the microscope, the design of the OVA being in accordance with another embodiment of the invention.
Figure 5:
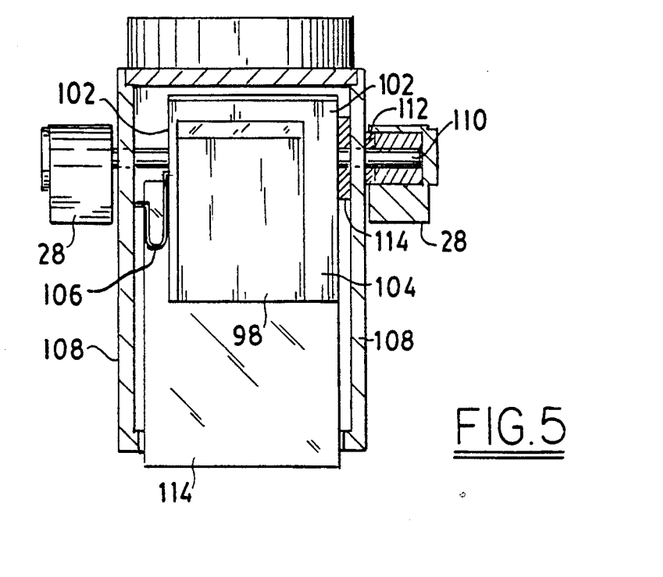
FIG. 5 is a sectional view taken along the line 5—5 in FIG. 4.

The optical axis extends to the oblique viewing mirror 114 along the axis portion 59. The mirror 114 is supported in a frame extending to the backside thereof. This frame is connected to a support mechanism which provides compound rotational movement of the mirror about an accurate path and translational movement in the direction of the axis 59. The accurate path of motion is provided by a linkage 116 which is connected to the viewing mirror at one of two pivot points 118 and 120. The point 118 is closer to the surface 96 being viewed and the point 120 is further away. The pivot point 120 is connected to a control arm 122, which extends through a slot 124 in the top 90 the housing 92. This arm 122 is connected to a guide plate 126 which has a slot through which pins 128 extend. This guide and slot arrangement defines a track or guide which restricts the movement of the arm 122 and the pivot point 120 to translational movement. However, the other end of the mirror can tilt since it is pivotally connected at 118. Both the angle and distance along the axis 58 are varied when the control arm is moved to change the oblique viewing angle, say from the angle a to the angle b as shown in FIG. 4. Since the optical path length remains approximately the same, over a range of viewing angles of interest, no further focusing adjustment is needed in the microscope.

Referring to FIGS. 6 through 12 there is shown a OVA 130 with an optical system contained in a housing 132. An adapter ring 134 is screwed into the objective end of the microscope 16 and is connected by set screws 138 (also labeled 138 in FIG. 2) to collar 160.

A motor mount 140 is clamped at 141 (see also FIG. 7) to the collar 160. The mount 140 contains a motor 142 and a gear drive having a worm gear 144 and spur gears 146 of larger and smaller diameter which are journaled in the mount 140. A neck 148 of the housing 132 extends upwardly from the top thereof and has an exterior gear 154 circumferentially around it. The housing neck 148 also carries a ball bearing journal 150 which allows the housing to rotate about the axis 52 thereby allowing the oblique viewing angle to orbit 360° around the surface 208 of the object under inspection. The gear 154 engages the smaller diameter one of the spur gears 46. Thus, as the motor rotates the motor mount 140, the entire OVA 130 rotates about the axis 52. A negative doublet lens 162 having a function similar to that of the lens 54 in FIGS. 2 and 3 is mounted inside the collar 160 on the axis 52.

Figure 6:
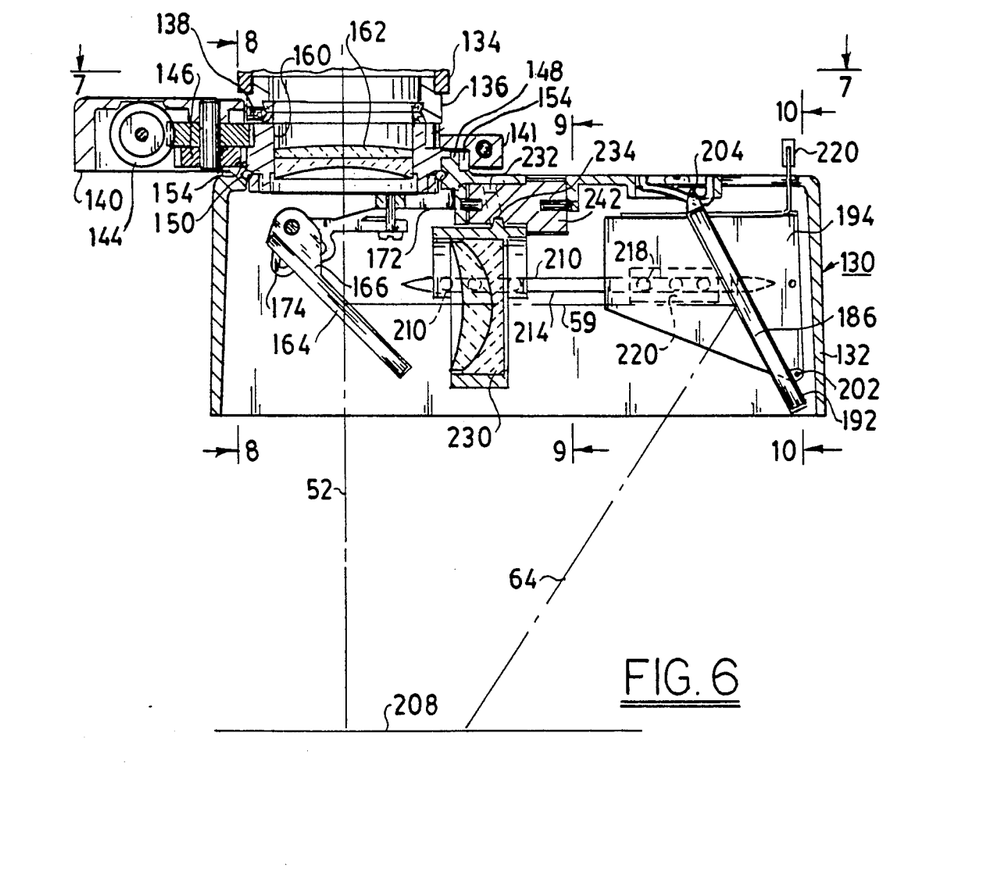
FIG. 6 is a sectional view similar to FIG. 4 of an OVA in accordance with the presently preferred embodiment of the invention.
Figure 7:
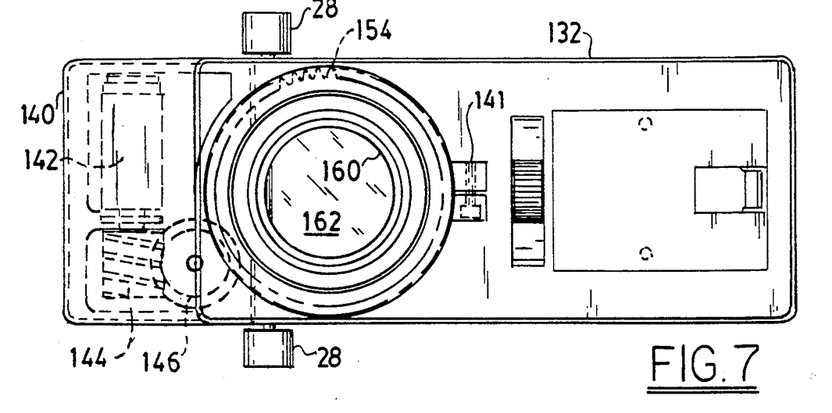
FIG. 7 is a plan view of the OVA shown in FIG. 6, the view being taken along the line 7—7 in FIG. 6.
Figure 8:
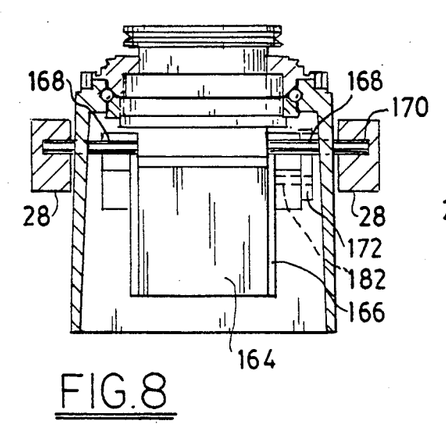
FIGS. 8, 9, 10 are vertical sectional views of the OVA shown in FIG. 6 respectfully taken along the line 8—8, 9—9, and 10—10 in FIG. 6.

The OVA 130 has a folding mirror 164 mounted in a frame 166 (see also FIG. 8) having ears 168 through which a shaft 170 extends. The knobs 28 for selection of the perpendicular or oblique viewing modes are connected to the ends of the shaft 170. Attached on a bracket 172 to the top wall of the housing 132 is a bracket holding the frame 166. The bracket includes plate with a pair of diverging slots 176 and 178 and a bridging portion 180. See also FIG. 11. A pin 182 extends from one of the ears 168 of the support frame 162. As the knob 28 and shaft 170 is turned, the pin 182 can be moved from one of the slots 176 to the other 178, in the process causing some deflection of the bridge 180. The slotted plate and pin 182 provide a detent or latch mechanism for holding the folding mirror either in the position shown in full lines where it folds the optical axis 52, 45° to the axis part 58 which is incident on the oblique viewing mirror 186.

Figure 9:
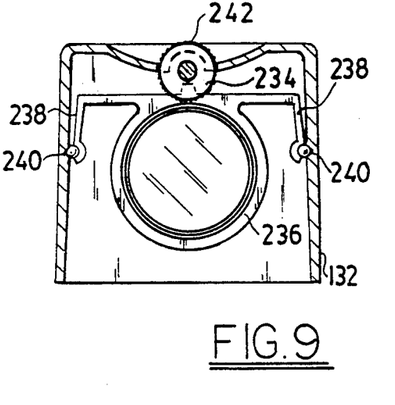
Figure 10:
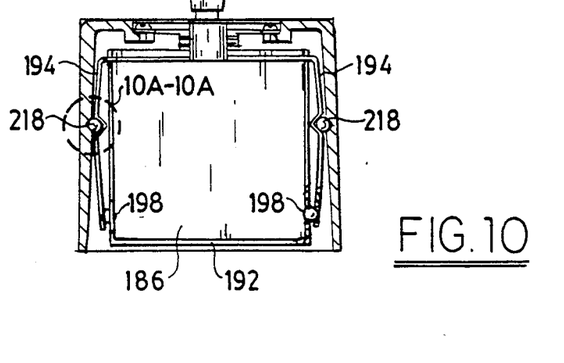
Figure 10A:
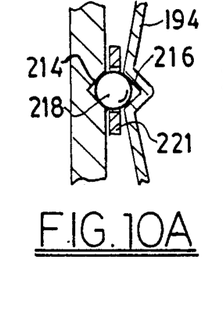
FIG. 10A is an enlarged view of a portion of FIG. 10.
Figure 11:
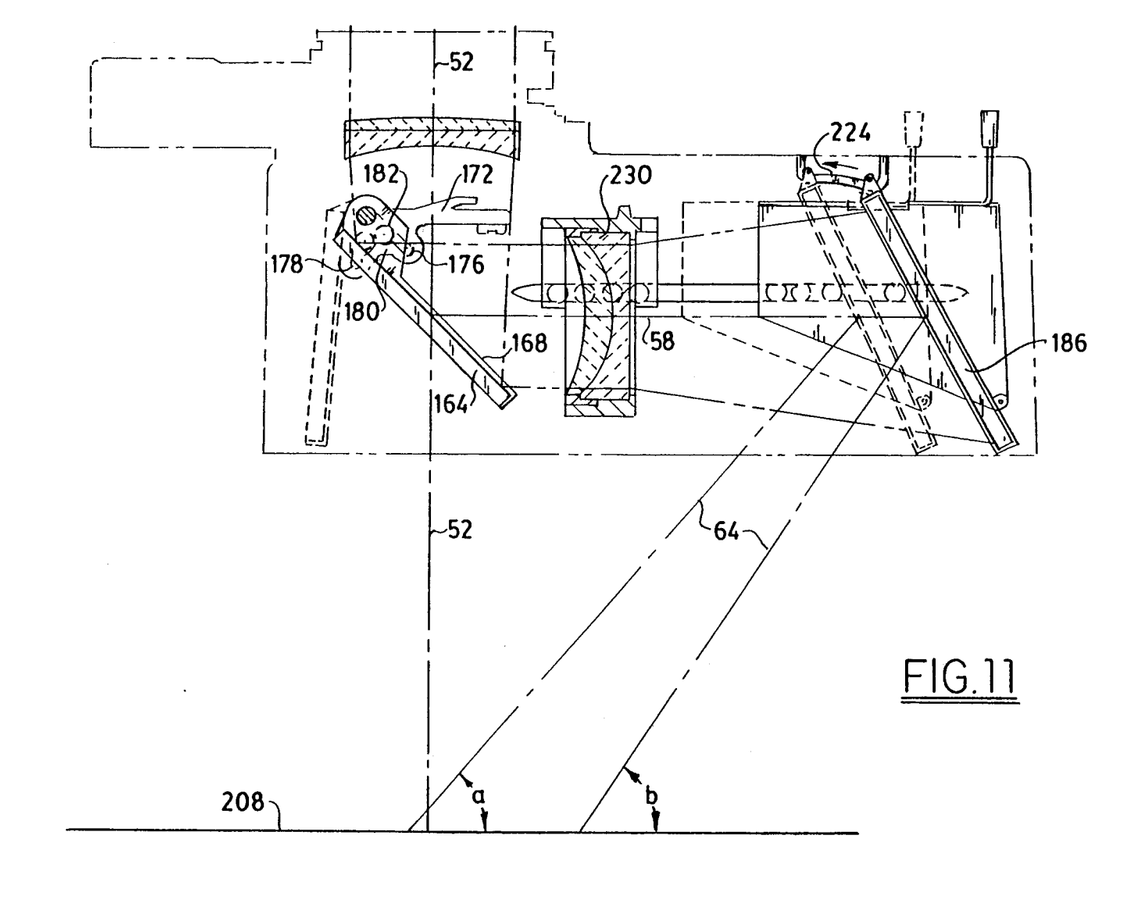
FIG. 11 is an enlarged view of the optical system of the OVA shown in FIG. 6.
Figure 12:
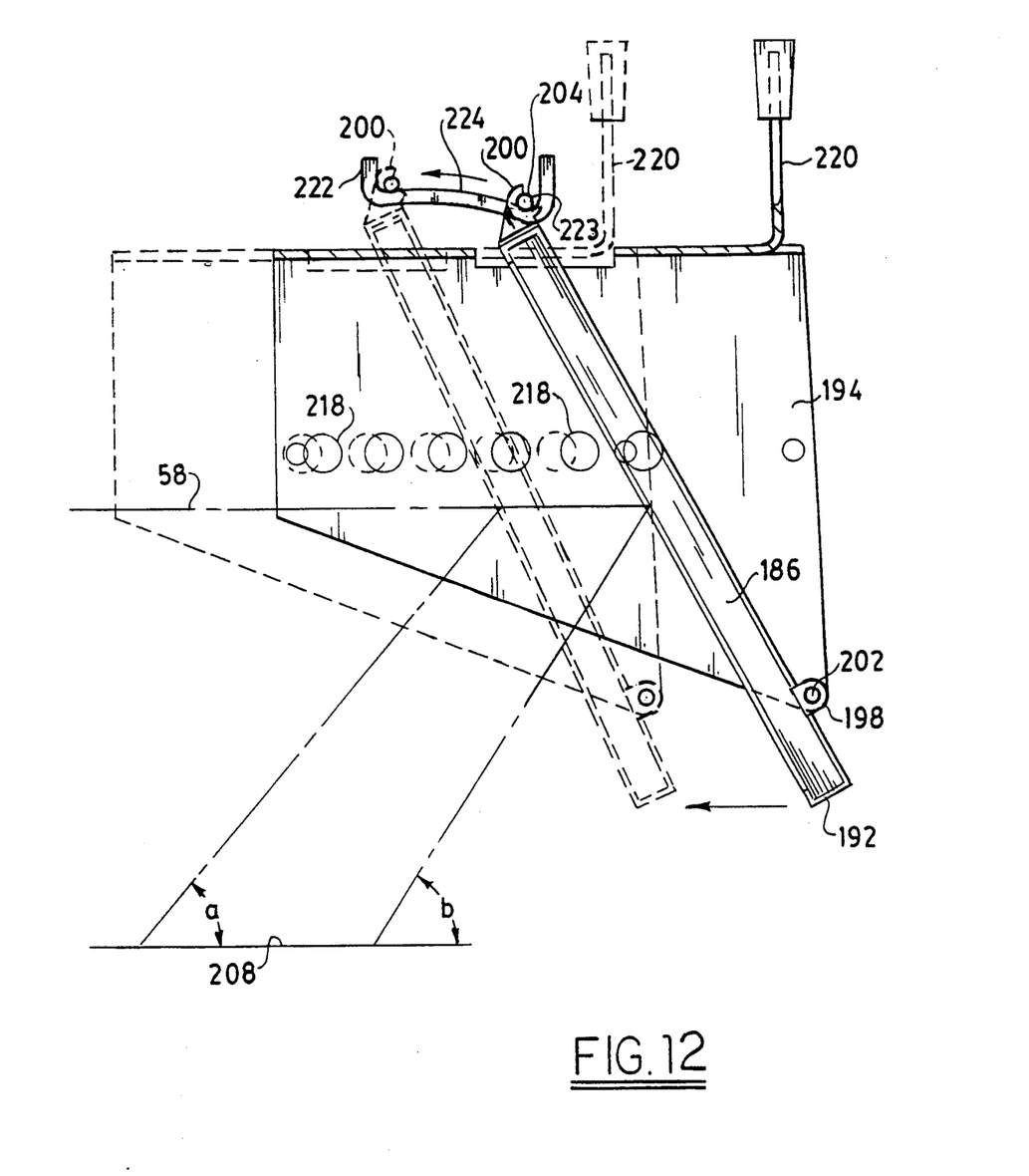
FIG. 12 is a further enlarged view of the oblique viewing mirror and its support mechanism shown in FIG. 11, which enables adjustment of oblique viewing angle without focus adjustment of the microscope during most practical inspection applications.

The mechanism allowing compound translational and rotational movement of the viewing mirror so as to maintain the optical path to the folding mirror 160 approximately the same length over a range of viewing angles of interest is shown in FIGS. 6, 8-10, 10A, 11 and 12. Two such viewing angles a & b, are shown in FIGS. 11 and 12. The viewing mirror 186 is contained in a frame 192 having side plates 194 of spring material connected thereto. See FIG. 10. Ears 198 and 200 (FIG. 12) provide pivotal connections at two points 202 and 204 via pins which extend from the ears. One of these pivotal connection points 202 is closer to the surface 208 under inspection. The other 204 is further away from that surface.

The side plates 194 are captured in a track or guide 210 provided by notches 214 in the sidewalls of the housing 130 and notches 216 in the side plates 194. Ball bearings 218, separated by being disposed in holes in a separator strip 221, provide a low-friction connection between the side plates 194 and the side walls of the housing.

The side plates are connected to an actuating arm 220 which may be manipulated to move the side plates and the mirror 186 translationally. Then, the pivot 198 translates in a direction along the optical axis portion 59 but does not rotate. The position of the pivot 198 (the lower pivotal connection point 202) is shown in FIG. 12.

Pins 223 extend from the upper ears 200 and ride on a track 222 provided by a arcuately curved member 224. As the support plates 194 and the lower pivot point 202 translate, the upper pivot 204 travels along the accurate path causing the reflective surface of the mirror 186 to tilt and change the oblique viewing angle. Accordingly, translational motion is accompanied by rotational motion along an accurate path and is a compound motion. The optical path length between the folding mirror and the surface 208 remains approximately the same over the range of oblique viewing angles.

In order to adjust the focus to inspect surface 208 at different heights, for example, at different levels on a printed circuit board to observe connections to different chips, a lens 230, show as a negative doublet, is moved along the optical axis 59 by means of a acme type thread or angled groove 232 which engages a tooth 234 on a bracket or a frame 236 (see also FIG. 9). Bracket 236 has side plates or fingers 238 which spring out and are guided in a ball bearing notch and groove guide structure 240 similar to the guide structure 214, 216, 218 which guides the support 194 for the viewing mirror 186. Accordingly, by turning a knob 242 accessible through the top of the housing 132 the lens 230 may be translated along the optical axis 58 to provide for a adjustment to such different heights.

From the foregoing description, it will be apparent that there has been provided an improved oblique viewing system adapted for use as an OVA for a microscope. Variations, modifications and other applications for the herein described apparatus, within the scope of the invention, will undoubtedly suggest themselves to those skilled in the art. Accordingly, the foregoing descriptions should be taken as illustrative, and not in a limiting sense.

I claim:

1. A system for viewing the surface of an object with a microscope along a first axis and a second axis which are at different angles to said surface which comprises a first mirror, a second mirror, means holding said first mirror on a pivot in either a first position or a second position, said first mirror being displaced from said first axis in said first position to present said surface to said microscope for viewing along said first axis, said first mirror being disposed across said first axis in said second position to define a third axis transverse to said first axis between said first mirror and said second mirror, said second mirror being spaced from said first mirror along said third axis, said second mirror facing said surface along said second axis so that said surface is viewed along said second axis when said first mirror is in said second position, wherein one of said different angles is between said surface and said second axis, and further comprising means for tilting said second mirror to vary the one of said different angles between said second axis and said surface, and further comprising a lens disposed between said first and second mirrors and moveable along said third axis for adjusting the focus of said surface at said microscope to accommodate displacements of said surface along said first axis.

2. A system for viewing the surface of an object with a microscope along a first axis and a second axis which are at different angles to said surface which comprises a first mirror, a second mirror, means holding said first mirror in either a first position or a second position, said first mirror being displaced from said first axis in said first position to present said surface to said microscope for viewing along said first axis, said first mirror being disposed across said first axis in said second position to define a third axis transverse to said first axis between said first mirror and said second mirror, said second mirror being spaced from said first mirror along said third axis, said second mirror facing said surface along said second axis so that said surface is viewed along said second axis when said first mirror is in said second position, and means for linearly displacing said second mirror along said third axis and tilting said second mirror to vary the angle between said second axis and said surface thereby providing an oblique viewing mode of operation having different oblique views while maintaining the optical path length from said first mirror when in said second position to said surface approximately equal for each of said oblique views.

3. The system according to claim 2, wherein said displacing and tilting means comprises support means pivotally connected to said mirror at at least two points one closer to and the other farther from said surface for providing combined translational and rotational motion of said second mirror.

4. The system according to claim 3 further comprising a housing having side and top walls extending along said third axis and a bottom wall opposite to said top wall which is open, said mirrors being disposed in said housing, said first mirror facing said top wall and said microscope through an opening in said top wall, and said second mirror facing said surface through said bottom to provide a path for said oblique views, said support means comprising a first member defining an accurate path in the direction along said third axis, said first member having a pivotal connection to one of said two points, a second member having a pivotal connection to said second mirror at the other of said two points, guide means in said housing for restricting movement of said second member and said other point to translation whereby said second mirror tilts as it executes movement along said accurate path and along said third axis.

5. The system according to claim 4 wherein said first member is provided by a linkage pivotally connected to said housing at at least one of said side walls and to said one of said two points, and said second member is a control arm pivotally connected to said second mirror at the other of said two points, said guide means comprising a plate connected to said arm and a guide on one of said walls with respect to which said guide plate is movable along said third axis.

6. The system according to claim 4 wherein said first member is a track defining said accurate path, at least one pin connected to said second mirror which rides on said track and provides said pivotal connection at said one of said points, and said second member is a part of a support mechanism connected to said second mirror pivotally at the other of said two points, means in at least one of said side walls defining a guide track in a direction along said third axis, and said support mechanism being captured in said track.

7. The system according to claim 4 further comprising a guide extending in a direction along said third axis, a lens mounted in said housing between said first and second mirrors in engagement with said guide for translational movement along said third axis when arcuated, and means extending through at lest one of said walls of said housing and engagable with sad lens for translating said lens along said third axis.

8. The system according to claim 4 further comprising a coupling rotatably connecting said housing to said microscope, and drive means mounted on one of said housing and said coupling for rotating said housing about said first axis with respect to said microscope so that said viewing mirror orbits about said object.

9. An oblique viewing system for enabling a microscope to view an object along an axis oblique to the surface of the object which comprises an oblique viewing mirror, a folding mirror, said folding mirror being disposed along a first axis between said surface and said microscope and having a reflecting surface facing said microscope, said oblique mirror having a reflecting surface facing the reflecting surface of sad folding mirror to define a path for light from said object's surface along a third axis oblique to said surface to said viewing mirror, then along a second axis to said folding mirror and then along said first axis to sad microscope, means for linearly displacing said viewing mirror along said second axis and tilting said viewing mirror to vary the angle between said third axis and said surface hereby providing an oblique viewing mode of operation having different oblique views while maintaining the optical path length from said folding mirror to said surface approximately equal for each of said oblique views.

10. The system according to claim 9 wherein said displacing and tilting means comprises support means pivotally connected to said viewing mirror at at least two points one closer to said surface and the other further from said surface providing combined translational and rotational motion of said viewing mirror.

11. The system according claim 10, further comprising a housing having side and top wall extending along said third axis and a bottom opposite to said top wall which is open, said mirrors being disposed in said housing, said folding mirror facing said top wall and said microscope through an opening in said top wall, and said viewing mirror facing said bottom to provide a path for said oblique views, said support means comprising a first member defining an accurate path about an axis in a direction between said side walls, said first member having a pivotal connection to one of said two points, a second member having a pivotal connection to said viewing member at the other of said two points, guide means in said housing for restricting movement of said second member and said other point to translation along said third axis whereby said viewing mirror tilts as it executes movement along said accurate path and along said third axis.

12. The system according to claim 11 wherein said first member is provided by a linkage pivotally connected to said housing at at least one of said side walls and to said one of said two points, and said second member being a control arm pivotally connected to said viewing mirror at the other of said two points, said guide means comprising a plate connected to said arm and a guide on one of said walls with respect to which said guide plate is movable along said third axis.

13. The system according to claim 11 wherein said first member is a track defining said path, at least one pin connected to said mirror which rides on said track and provides said pivotal connection at said one of said two points, and said second member is part of a support mechanism connected to said viewing mirror pivotally at the other of said two points, and means along least one of said side walls defining a guide along said third axis, said support mechanism being captured in said guide.

14. The system according to claim 11 further comprising a guide extending in a direction along said third axis, a lens mounted in said housing between said first and second mirrors in engagement with said guide for translational movement along said third axis when arcuated, and means extending through one of said walls of said housing and engagable with said lens for translating said lens along said third axis.

* * * * *